US 7,685,071 B2

(12) United States Patent
Terauchi et al.

(10) Patent No.: US 7,685,071 B2
(45) Date of Patent: Mar. 23, 2010

(54) MOBILE COMMUNICATION TERMINAL

(75) Inventors: Toru Terauchi, Tokyo (JP); Jun Sato, Kanagawa-ken (JP); Keiko Watanabe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 73 days.

(21) Appl. No.: 11/406,212

(22) Filed: Apr. 18, 2006

(65) Prior Publication Data
US 2007/0203839 A1    Aug. 30, 2007

(30) Foreign Application Priority Data
Apr. 18, 2005    (JP)    ............... 2005-119832

(51) Int. Cl.
G06F 21/00    (2006.01)
(52) U.S. Cl. .................. 705/59; 713/193; 713/160; 713/165; 380/247; 380/248; 380/277; 726/26; 705/51; 705/57
(58) Field of Classification Search ................. None
See application file for complete search history.

(56) References Cited

U.S. PATENT DOCUMENTS

| | | | |
|---|---|---|---|
| 5,982,891 A | | 11/1999 | Ginter et al. |
| 7,024,561 B2* | | 4/2006 | Inoha et al. ............... 713/182 |
| 7,191,343 B2* | | 3/2007 | Tuoriniemi et al. ........ 713/193 |
| 7,203,966 B2* | | 4/2007 | Abburi et al. ............... 726/29 |
| 7,263,497 B1 | | 8/2007 | Wiser et al. |
| 7,346,170 B2 | | 3/2008 | Asano et al. |
| 7,415,439 B2* | | 8/2008 | Kontio et al. ............... 705/53 |
| 7,487,363 B2* | | 2/2009 | Alve et al. ................. 713/193 |
| 7,487,547 B2* | | 2/2009 | Nakai et al. ................. 726/26 |
| 2003/0023564 A1 | | 1/2003 | Padhye et al. |
| 2003/0167392 A1 | | 9/2003 | Fransdonk |
| 2004/0128252 A1 | | 7/2004 | Shirai et al. |
| 2004/0168077 A1 | | 8/2004 | Waxman et al. |
| 2004/0243819 A1 | | 12/2004 | Bourne et al. |

(Continued)

FOREIGN PATENT DOCUMENTS

JP    02-260841 A    10/1990

(Continued)

OTHER PUBLICATIONS

Japanese Office Action dated Apr. 21, 2009 (3 pages), and English translation thereof 5 pages) issued in counterpart Japanese Application No. 2005-343995 of related U.S. Appl. No. 11/497,734.

(Continued)

Primary Examiner—Calvin L Hewitt, II
Assistant Examiner—Mamon Obeid
(74) Attorney, Agent, or Firm—Frishauf, Holtz, Goodman & Chick, P.C.

(57) ABSTRACT

A mobile communication terminal moves and backs up a content, which was downloaded from a content server, to a personal computer. When the mobile communication terminal receives an encryption key generation request from the personal computer via a cable, the mobile communication terminal extracts information to be used for generating the encryption key and generates the encryption key by using the extracted information and own telephone number. And the generated encryption key is transmitted to the personal computer via the cable. Accordingly, the backed up and moved content can be reproduced with the personal computer.

9 Claims, 14 Drawing Sheets

U.S. PATENT DOCUMENTS

| | | |
|---|---|---|
| 2004/0260923 A1* | 12/2004 | Nakai et al. .................. 713/165 |
| 2005/0210249 A1* | 9/2005 | Lee et al. .................... 713/168 |
| 2005/0257074 A1 | 11/2005 | Alkove et al. |
| 2006/0021063 A1 | 1/2006 | Hori |
| 2006/0069652 A1 | 3/2006 | Ebihara et al. |
| 2006/0149683 A1* | 7/2006 | Shimojima et al. ............ 705/59 |
| 2006/0174110 A1 | 8/2006 | Strom et al. |
| 2007/0121942 A1 | 5/2007 | Watanabe et al. |
| 2007/0124245 A1 | 5/2007 | Sato et al. |
| 2008/0216177 A1 | 9/2008 | Yokosato et al. |
| 2009/0055935 A1 | 2/2009 | Tsurukawa |

FOREIGN PATENT DOCUMENTS

| | | |
|---|---|---|
| JP | 10-208388 A | 8/1998 |
| JP | 2001-309332 A | 11/2001 |
| JP | 2003-008563 A | 1/2003 |
| JP | 2003-110541 A | 4/2003 |
| JP | 2003-303137 A | 10/2003 |
| JP | 2004-048180 A | 2/2004 |
| JP | 2004-112042 A | 4/2004 |
| JP | 2004-350150 A | 12/2004 |
| JP | 2005-094481 A | 4/2005 |

OTHER PUBLICATIONS

K. Seki et al., "A Proposal of A New Distribution Scheme for Software Products," Information Processing Society Research Report (93-IS-45), Japan, Information Processing Society of Japan, Jul. 20, 1993, vol. 93, No. 64, p. 19 to 28.

* cited by examiner

| CONTENT LIST | |
|---|---|
| AAA | 10:00:00 |
| BBB | 08:00:00 |
| CCC | 00:23:34 |

MOBILE COMMUNICATION TERMINAL

CROSS-REFERENCE TO RELATED APPLICATIONS

This application is based upon and claims the benefit of priority from prior Japanese Patent Application No. 2005-119832, filed Apr. 18, 2005, the entire contents of which are incorporated herein by reference.

FIELD OF THE INVENTION

The present invention relates to an information terminal having a communication function, such as a mobile telephone and personal digital assistant (PDA), and, more particularly, to an information terminal having a function of acquiring content from an information site and storing/playing it back.

DESCRIPTION OF THE BACKGROUND

In recent years, streaming services that allow users to download rich content such as music from content servers to information terminals have begun to prevail. In the information terminal that utilizes such services, the downloaded content is temporarily stored in memory, and the stored content is read out from memory and played back in accordance with a user request.

On the other hand, it is proposed to use a hard disk (HDD) as a memory used to store contents. If the HDD is used as the memory, a large amount of content can be stored with lower cost than with use of a flash memory or the like. However, the HDD is generally vulnerable to shock and easily breaks.

Hence, content stored in the HDD is backed up to an external storage device. Desirably, one can restore backup files of the content from the external storage device to the HDD when the content cannot be used due to a problem with the HDD or the like.

For example, in a known method, when the content server downloads content with the use condition to the information terminal, it appends the network address of a backup server to the content to be downloaded. The information terminal transmits the content to the backup server by using the network address upon backing the downloaded content. The backup server saves the transmitted content in correspondence with the telephone number of the information terminal as the transmission source. However, this method requires a dedicated backup server, and imposes the content provider an economical burden. Note that the technique that uses the backup server is disclosed in detail in Jpn. Pat. Appln. KOKAI Publication 2004-48180.

On the other hand, a technique for backing up content stored in a mobile telephone or mobile terminal such as a PDA or the like using a personal computer has been proposed. For example, content stored in a HDD of a mobile terminal is encrypted together with its usage rule, and the encrypted content including the usage rule is copied to the personal computer intact. When the content is deleted due to a problem with the HDD or the like, the encrypted content including the usage rule is restored from the personal computer to the HDD.

Also, in order to use a memory of a mobile terminal effectively, a user can move the downloaded content and the usage rule to a personal computer and delete the downloaded content and usage the rule from the memory after backing up.

Here, it is required to play the content, which is copied from the mobile terminal as a backup file, in the personal computer having a large display.

However, it is prohibited to play the content other than the terminal which downloaded the content.

BRIEF SUMMARY OF THE INVENTION

The invention has been devised in view of the circumstances and it is an object of this invention to provide a mobile communication terminal being capable of making an external device such as a personal computer reproduce a backed up content and moved content from the mobile terminal.

In order to attain the object, the invention may provide a portable terminal, which comprising: downloading means for downloading a content from a content server, encrypting means for encrypting a content with an encryption key and generating an encrypted content, a first memory configured to store first information inherent to the mobile communication terminal, a second memory configured to store the encrypted content and a download time which is added to the content when the downloading means downloads the content, content moving means for moving the encrypted content and the download time stored in the second memory to an external device, key generating means for generating the encryption key by using the download time and the first information, control means, if a key generation request which includes the download time is received, for extracting the download time from the request and for making the key generating means generate the encryption key by using the extracted download time and the first information stored in the first memory, and transmitting means for transmitting the encryption key generated by the key generating means to the external device.

It is another object of this invention to provide a mobile communication terminal being capable of making an another mobile communication terminal reproduce a content which the mobile communication terminal has extracted from an external device.

In order to attain the object, the invention may provide a portable terminal, which comprising: an interface configured to receive a content from a external device, a first memory configured to store first information inherent to the mobile communication terminal, key generating means for generating a first encryption key by using the first information and a second encryption key by using a second information transmitted from a second mobile communication terminal, encrypting means for encrypting the received content with the first encryption key and outputting a first encrypted content;

a second memory configured to store the first encrypted content, re-encrypting means, if content moving request to the second communication terminal is inputted, for decrypting the first encrypted content with the first encryption key, encrypting the decrypted first encrypted content with the second encryption key, and outputting a second encrypted content, and transmitting means for transmitting the second encrypted content to the second communication terminal.

BRIEF DESCRIPTON OF THE DRAWINGS

FIG. 8 shows an example of the content list displayed on a display of a personal computer.

DETAILED DESCRIPTION OF THE INVENTION

First Embodiment

Figure 1:
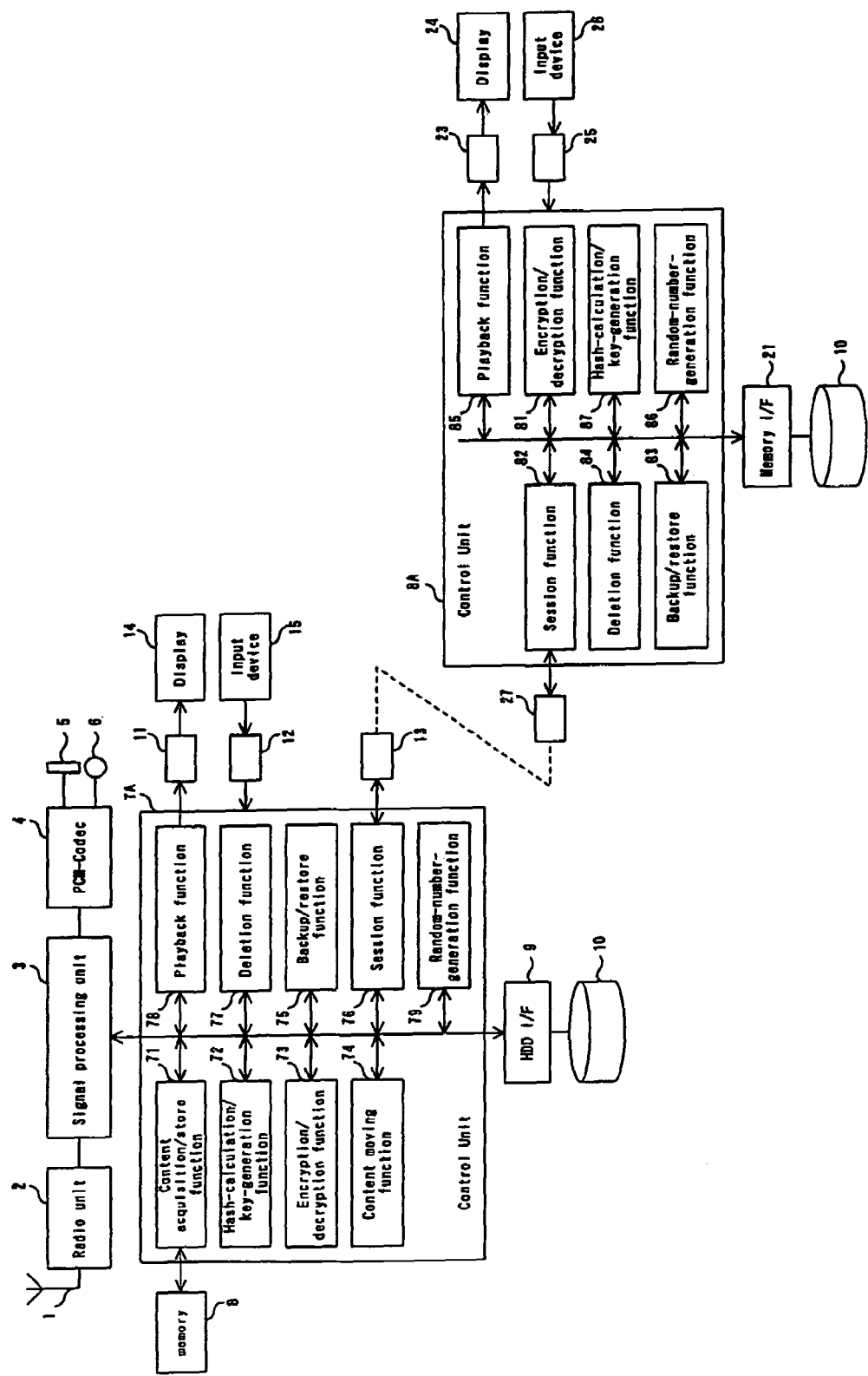
FIG. 1 is a block diagram showing configuration of a mobile terminal and a personal computer.

FIG. 1 is a block diagram showing a configuration of a mobile terminal and a personal computer corresponding to the first embodiment of the present invention.

The configuration of mobile terminal 10A is described first.

A radio signal transmitted from a base station (not shown) is received by an antenna 1 and is input to radio unit 2. Radio unit 2 performs downconversion of the received radio signal, a quadrature demodulation process of the down-converted intermediate frequency signal, despread of respective passes and symbol mixing process of a RAKE receiver, and the like. Received packet data output from the RAKE receiver is input to signal processing unit 3.

Signal processing unit 3 comprises, e.g., a digital signal processor (DSP), and demultiplexes the received packet data for respective media, and decodes the demultiplexed data for respective media. For example, if the received packed data includes audio data, the audio data is decoded by the speech codec included in signal processing unit 3. If the received packed data includes video data, the video data is decoded by a video codec included in signal processing unit 3. Furthermore, if the received packed data is a downloaded content, signal processing unit 3 expands the downloaded content and input control unit 7A.

The digital audio data obtained by decoding is PCM-decoded by PCM encoder/decoder (hereinafter CM codec 4, is amplified by an amplifier (not shown), and is then output from loudspeaker 5. The digital video signal decoded by the video codec is supplied from control unit 7A to display interface 11, and is displayed on display 14.

On the other hand, a voice signal input to microphone 6 is amplified by an amplifier (not shown) and is PCM-encoded by PCM codec 4 to obtain a digital audio signal. The digital audio signal is input to signal processing unit 3. Signal processing unit 3 compresses and encodes the digital audio signal. Also, a video signal output from a camera (not shown) and text data such as a mail message created by control unit 7A are compressed and encoded in signal processing unit 3. The compressed transmission data are multiplexed to packed data, which is input to radio unit 2.

Radio unit 2 performs a modulation process of the packet data and up-conversion to a radio signal. The modulation process includes a spread spectrum process and a digital modulation process such as quadrature phase-shift keying (QPSK) or the like. The radio transmission signal generated by the up-conversion is power-amplified and filtered by the transmission filter. The transmission signal output from the transmission filter is transmitted from antenna 1 to the base station.

Mobile terminal 10A has internal memory 8 and hard disk (HDD) 10 as storage media. An EEPROM, which is inaccessible from personal computer 20A via interface 13, is used for internal memory 8. By contrast, HDD 10 is set to be accessible from personal computer 20A via interface 13.

Control unit 7A comprises, e.g., a microcomputer (central processing unit [CPU]). The control unit has, as control functions according to the present invention, content acquisition/store function 71, hash-calculation/key-generation function 72, encryption/decryption function 73, content-moving function 74, backup/restore function 75, session function 76, deletion function 77, playback function 78, and random-number-generation function 79. Note that these functions 71 to 79 are realized by the CPU to execute programs.

Content acquisition/store function 71 downloads content, as a content file, from a content server (not shown). The downloaded content file includes video data and audio data. In addition, the downloaded content file may include usage rule such as the number of times of playback and/or the reproduction period. Function 71 executes a series of processes for storing the downloaded content in internal memory 8 with time information indicating download time (hereinafter ownload time, then moving the downloaded content to HDD 10 if moving request is inputted by a user.

Hash-calculation/key generation function 72 generates an encryption key by using the download time and/or random number generated by random-number-generation function 79, and telephone number or terminal identification number of mobile terminal 10A. Function 72 also generates the encryption key, when an encryption key generation request is received from personal computer 20A via interface 13, by using the download time and/or random number contained in the request, and the telephone number or terminal identification number stored in mobile terminal 10A. In addition, hash calculation, to be used for establishing a secure session between mobile terminal 10A and personal computer 20A, is executed by function 72.

Encryption/decryption function 73 decrypts an encrypted content by using encryption key generated by hash-calculation/key generation function 72, when content playback request is received from playback function 78. Also, function 73 executes encryption and decryption process when the secure session between mobile terminal 10A and personal computer 20A is established. Meanwhile, AES (Advanced Encryption Standard) technique may be applied to function 73 as an encryption method.

Content-moving function 74 moves the encrypted content from the HDD 10 to the personal computer 20A via interface 13. Meanwhile, this process means that it makes the encrypted content reside only in memory 22 of personal computer 20A.

Backup/restore function 75 copies the encrypted content in HDD 10 and transfers it to memory 22 of personal computer 20A via interface 13. Also, function 75 transfers the encrypted content from memory 22 to HDD 10 when restoration request is inputted by a user. Meanwhile, this process means that it makes the encrypted content reside both in memory 22 and in HDD 10.

Session function 76 establishes a session to personal computer 20A via interface 13 when plurality types of data, for example the encrypted content, are transferred between mobile terminal 10A and personal computer 20A. A secure session is established if the encryption key is transferred from mobile terminal 10A to personal computer 20A an authentication process is executed between mobile terminal 10A and personal computer 20A. The process of establishing a secure session will be described later.

Deletion function 77 executes the deletion of the content from internal memory 8 and the deletion of the encrypted content from HDD 10 if deletion request is inputted from input device 15. Then, usage rule, download time, and random number corresponding to the encrypted content, and usage rule and download time corresponding to the content are also deleted respectively.

Playback function 78 replays designated content stored in internal memory 8 and HDD 10 based on an operation of input device 15. Meanwhile, if the content stored in the HDD 10 is designated, an encryption key, generated by function 72, is used for decryption since the content is stored in HDD 10 in encrypted form.

Random-number-generation function 79 generates a random number to be used for generating an encryption key and establishing a secure session.

Mobile terminal 10A is equipped with display 14 such as a LCD, a plurality of numeric keys, each key assigned one number and at least one alphabet, and a function key for displaying a menu and activating an application program such as mail application.

Meanwhile, interface 13 is such an interface connectable to a wired cable, for example USB (Universal Serial Bus) cable and, and connectable to a wireless LAN, for example Bluetooth.

Then, the configuration of personal computer 20A is described.

Control unit 8A also equips a CPU like mobile terminal 10A, and encryption/decryption function 81, session function 82, backup/restore function 83, deletion function 84, playback function 85, random-number-generation function 86, and hash-calculation/key-generation function 87 are realized by the CPU to execute programs.

Encryption/decryption function 81 decrypts an encrypted content by using an encryption key generated by mobile terminal 10A if decryption request is received from playback function 85.

Session function 82 establishes a session to mobile terminal 10A when transferring and receiving a plurality of information such as the encrypted content. Also, the session function establishes a secure session to mobile terminal 10A when transmitting an encryption key generation request which includes download time and/or random number and receiving the encryption key generated by mobile terminal 10A.

Backup/restore function 83 stores an encrypted content together with download time and/or random number from mobile terminal 10A in memory 22 when a backup request is received. Further, backup/restore function 83 transfers an encrypted content to mobile terminal 10A when a restore request is received.

Deletion function 84 deletes an encrypted content from memory 22 when a deletion request is inputted by input device 26.

Playback function 85 requests a content key to the mobile terminal 10A when playback instruction is inputted by input device 26. Then, the request for the content key includes download time and/or random number stored corresponding to a content to be replayed in memory 22. After that, playback function 85 replays a content decrypted by using the content key from mobile terminal 10A.

Random-number-generation function 86 generates a random number used for establishing the secure session between mobile terminal 10A and personal computer 20A.

Hash-calculation/key-generation function 87 executes hash-calculation need to establishing the secure session and generates an encryption key for encrypting a content.

In addition, personal computer 20A has display 24 such as a liquid crystal display, input device 26 for inputting alphabets and numerals, and interface 27 for connecting to mobile terminal 10A and so on.

Here, an operation executed by mobile terminal 10A and personal computer 20A will be described.

(1) Downloading and Storing a Content

Figure 2:
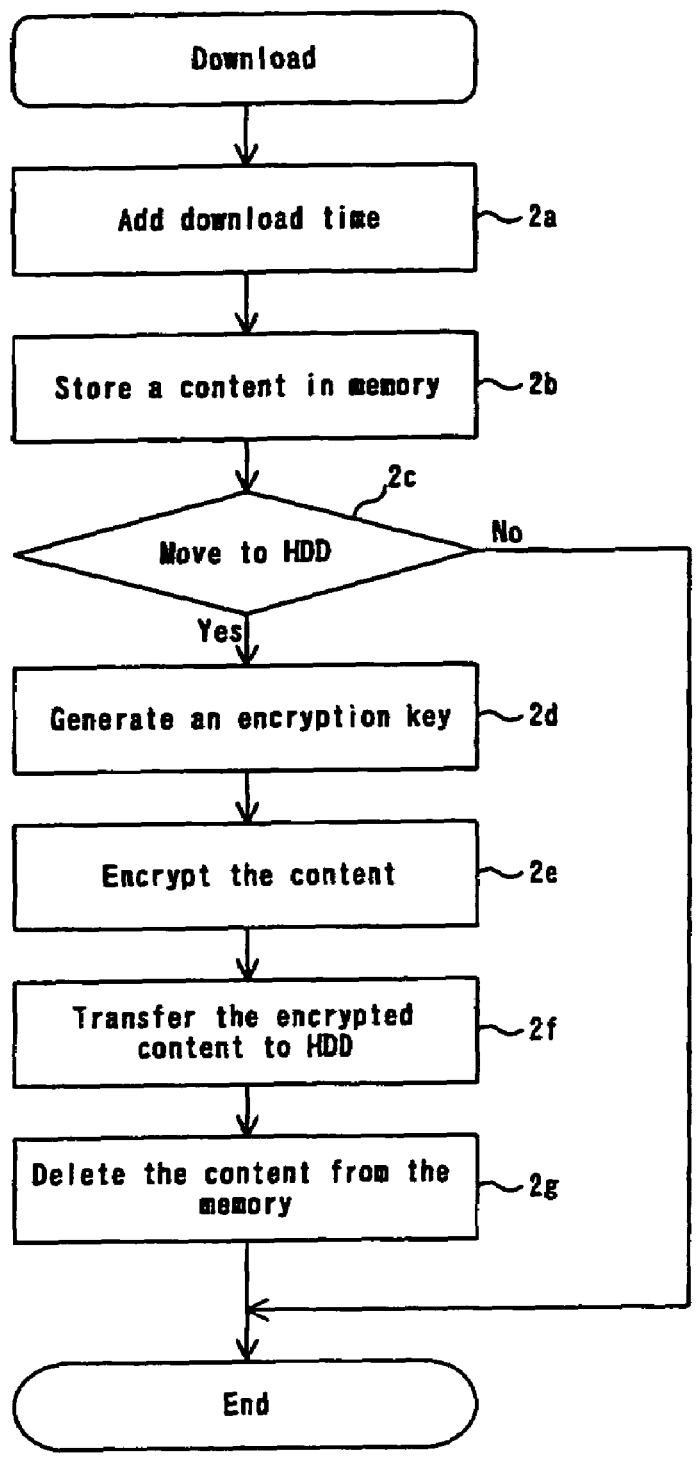
FIG. 2 is a flow chart showing a content downloading process and storing process.

FIG. 2 is a flowchart showing a content downloading process and storing process.

When content acquisition/store function 71 receives a content download request based on the operation of input device 16, function 71 downloads a designated content from a content server via a base station (STEP 2a). Meanwhile, a user inputs a download request by selecting a content from a content list, which has been downloaded and stored in memory 8.

Control unit 7A captures a download time from a clock unit (not shown) and adds this download time to the downloaded content (STEP 2b).

However, control unit 7A may use standard time from the base station as a download time.

Then, the downloaded content and the download time are stored in memory 8 (STEP 2c).

After the downloaded content and the download time has been stored in memory 8, a query, which requests the user whether moving the downloaded content to HDD10, is displayed on display 14. If the user inputs an instruction for moving the downloaded content (YES of STEP 2d), function 71 requests hash-calculation/key-generation function 72 to generate an encryption key. This request includes the download time added to the content to be moved. Then, function 72 generates an encryption key with the download time from function 71 and the telephone number of mobile terminal 10A (STEP 2e).

When the encryption key has been generated by function 72, encryption/decryption function 73 encrypts the content to be moved and outputs an encrypted content (STEP 2f).

If the encryption process has been completed, function 71 moves the encrypted content and the download time to HDD 10 via interface (HDD I/F) 9 and deletes the content and the download time from memory 8 (STEP 2g). Then, the downloading process is finished.

Figure 3:
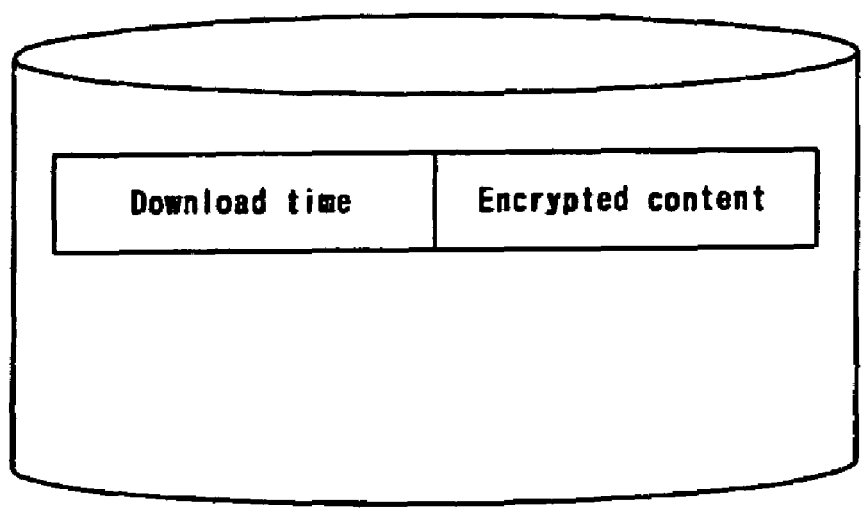
FIG. 3 shows an example of the content stored in a HDD.

FIG. 3 shows an example of the content stored in HDD 10, where the encrypted content and the download time are stored in HDD 10 in the state they are related mutually.

On the other hand, in a case that the user inputs an instruction for not moving the downloaded content to HDD 10 (NO of STEP 2d) the download process is finished as well.

(2) Backing Up a Content

As described above, the HDD is generally vulnerable to shock and easily broken. Therefore, the content stored in the HDD is needed to be backed up by an external device such as a personal computer. For example, the user connects interface 13 of mobile terminal 10A with the interface 27 of personal computer 20A by a USB cable, and transfers the content from HDD 10 to memory 22.

Figure 4:
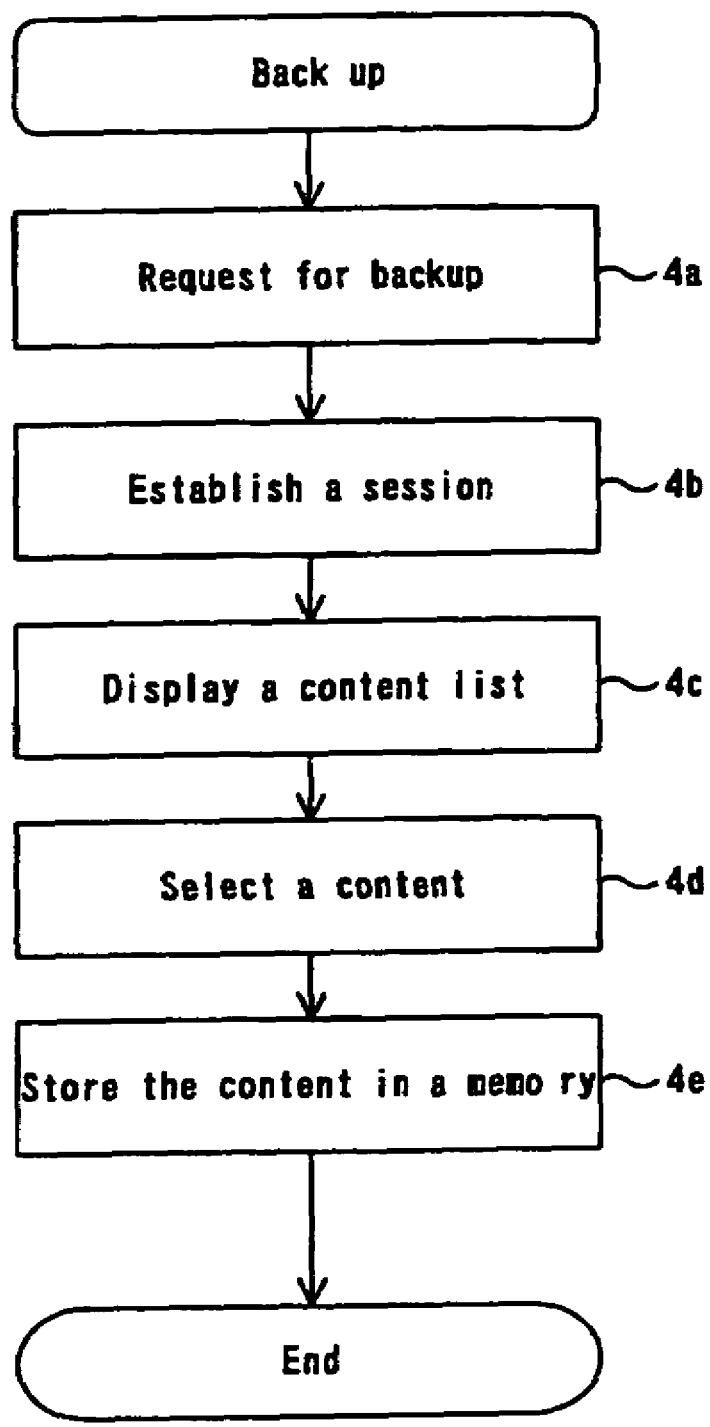
FIG. 4 is a flow chart showing backing up process of a content.

FIG. 4 is a flow chart showing backing up process of a content.

When the user operates input device 26 of personal computer 20A and request to back up the content stored in HDD 10 (STEP 4a), session function 82 of control unit 8A establishes a session between session function 76 of mobile terminal 10A via interface 27 (STEP 4b).

If the session has been established, backup/restore function 83 accesses HDD 10 of mobile terminal 10A and obtains the content list. And the obtained content list is displayed on display 24 (STEP 4c). In addition, it is considered that the content list is not encrypted.

Figure 5:
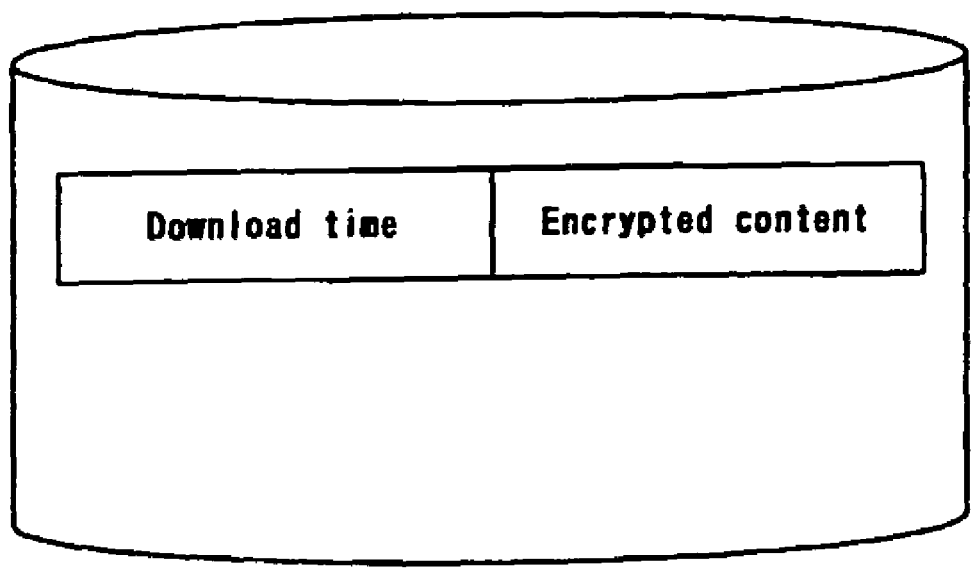
FIG. 5 shows an example of a backed up content in a memory of a personal computer.

If one content is selected from the displayed content list (STEP 4e), function 83 reads out the download time and the encrypted content from HDD 10 and stores them in memory 22 (STEP 4f). Then, the backup process is completed. At this time, as shown in FIG. 5, the encrypted content is related to the download time and stored in memory 22.

As described above, the backup process of the content downloaded to mobile terminal 10A is finished.

On the other hand, when restoring the backed up content to HDD 10 of mobile terminal 10A, also the user connects mobile terminal 10A with personal computer 20A by the cable such as a USB cable, and input a restoration instruction using input device 26.

In addition, the above explanation shows that the content backup is executed by operating personal computer 20A, however such backup process can be performed from mobile terminal 10A. In this case, the user activates a backup function by operating input device 15 and selects a content to be backed up from a displayed content list on display 14. Then, a session between mobile terminal 10A and personal computer 20A is established by session function 76 and session function 83, and the encrypted content and the download time are stored in memory 22 of personal computer 20A.

The above described description shows that the download time is related to the content or the encrypted content, however a random number, generated by random-number-generation function 79, may be related to the downloaded content or the encrypted content in place of the download time. In addition, the download time and the random number may be stored with the content or the encrypted content. In this case, hash-calculation/key-generation function 72 generates the encryption key based on the random number or both the random number and the download time.

(3) Content Movement

The content stored in HDD 10 may be moved to the memory of an external device in case that there are lots of contents in HDD 10.

Figure 6:
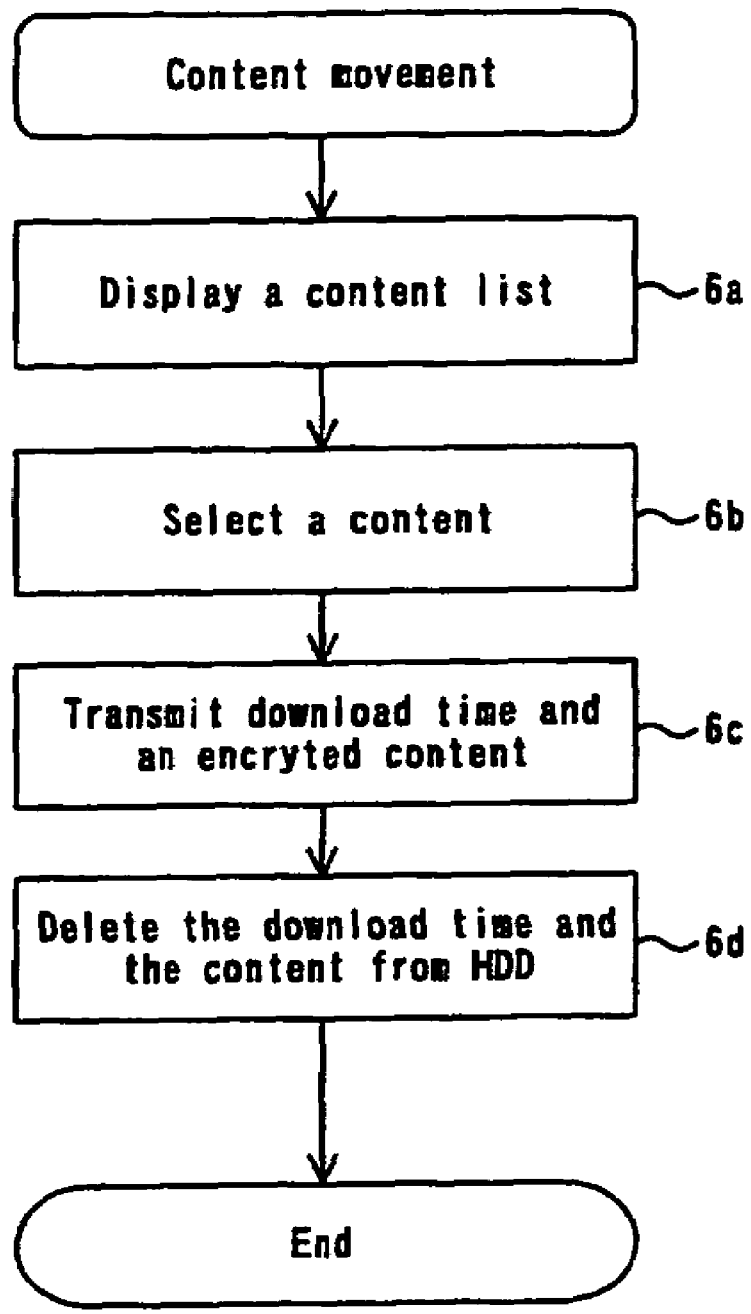
FIG. 6 is a flow chart showing the content movement from a HDD to a memory of personal computer.

FIG. 6 is a flow chart showing the content movement from HDD 10 to the memory of personal computer 20A.

Firstly, when a request for the content list, regarding the contents stored in HDD 10, is inputted by operating input device 15 of mobile terminal 10A, control unit 7A reads our the content list from HDD 10 and displays the list on display 14 (STEP 6a).

And, if the user select at least one content, to be moved to personal computer 20A, from the displayed content list (STEP 6b), content-moving function 74 reads out the designated encrypted content and the download time stored with the encrypted content, and transmits the content and the download time to personal computer 20A via the session established by function 76 and 82 (STEP 6c). When this transmitting process is finished, function 74 requests deletion function 77 to delete the content(s), which has been moved to personal computer 20A. Accordingly, function 77 deletes the encrypted content and the download time, which has been moved to personal computer 20A, is deleted from HDD 10 (STEP 6d). As described above, the content movement is finished.

On the other hand, the encrypted content and the download time having been moved to the personal computer 20A is stored in memory 22 controlled by control unit 8A.

(4) Content Reproduction by the Personal Computer

Subsequently, it will be described that the backed up and moved content reproduction process by personal computer 20A.

As described above, the content, which has been backed up to and moved to personal computer 20A, is stored in memory 22. In this state, the encrypted content stored in memory 22 cannot be reproduced because personal computer 20A does not store all information for generating the encryption key. That is, the personal computer stores only the download time.

Therefore, when the content, which has been backed up to and moved to personal computer 20A, is reproduced with personal computer 20A, a request for generating an encryption key is transmitted to mobile terminal 10A. And when personal computer 20A receives the encryption key from mobile terminal 10A, the encrypted content can be reproduced with personal computer 20A. That is, the encrypted content can be reproduced with personal computer 20A on condition that personal computer 20A is connected to mobile terminal 10A via interface 27.

Here, the process of reproducing the encrypted content with personal computer 20A will be described with reference to FIG. 7.

When the input device 26 of personal computer 20A is operated and a request for displaying a content list stored in memory 22 is inputted (STEP 7a), control unit 8A reads out the content list from memory 22 and display it on display 24 (STEP 7b). FIG. 8 shows an example of the content list displayed where three titles, for instant AA BB and CC are displayed. In addition, mark indicates that the content corresponding to this title is moved from or backed up from mobile terminal 10A.

When one content from the displayed content list on display 24 is selected (YES of STEP 7c), control unit 8A checks whether the selected content is moved or backed up content (STEP 7d). This verification can be easily realized to add a flag, indicating whether the content is the content having been moved or backed up, to the contents. In addition, if only the content which is backed up or moved has the download time, the verification can be realized to check whether the download time is added to the content.

Here, when the content titled AA is selected (YES of STEP 7d), control unit 8A reads out the download time added to the selected content from memory 22 and transmits a request for generating a encryption key to mobile terminal 10A via the session established by function 76 and function 82 because the selected content is the content moved or backed up (STEP 7e). After that, control unit 8A requests function 82 to establish a secure session, and prepares for reception the encryption content securely from mobile terminal 10A. And after the secure session has been established, personal computer 20A receives the encryption key which is generated by mobile terminal 10A based on the download time and the telephone number of mobile terminal 10A (STEP 7f). When personal computer 20A receives the encryption key, encryption/decryption function 81 decrypts the encrypted content titled AA using the received encryption key (STEP 7g), and the decrypted content is displayed on display 24 controlled by playback function 85.

Next, the secure session established by session function 76 and session function 82 will be described.

Figure 9:
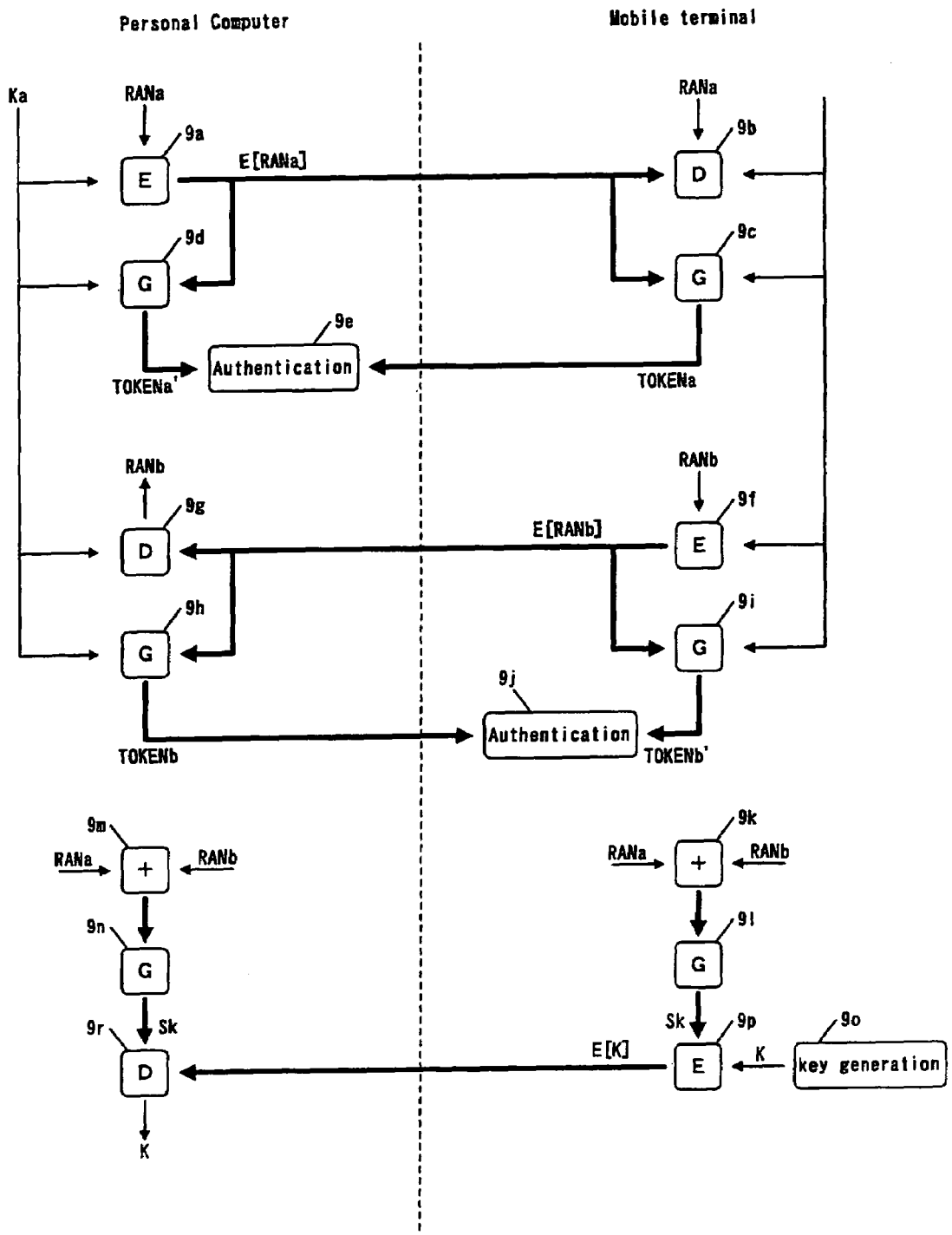
FIG. 9 is a flowchart showing the process to establish the secure session.

FIG. 9 is a flowchart showing the process to establish the secure session.

Firstly, encryption/decryption function 81 of control unit 8A encrypts random number RANa, generated by random-number-generation function 86, with an authentication key Ka (STEP 9a). And the encrypted random number E[RANa] is transmitted to mobile terminal 10A via interface 27.

When control unit 7A of mobile terminal 10A receives the encrypted random number E[RANa], the E[RANa] is transferred to encryption/decryption function 73. Then, function 73 decrypts the E[RANa] using the some authentication key Ka as used by function 81 and extracts the random number RANa (STEP 9b). In addition, encryption/decryption function 73 calculates TOKENa by inputting the authentication key Ka and the E[RANa] to a one-way function (STEP 9c). The TOKENa is transmitted to personal computer 20A via interface 13.

Figure 10:
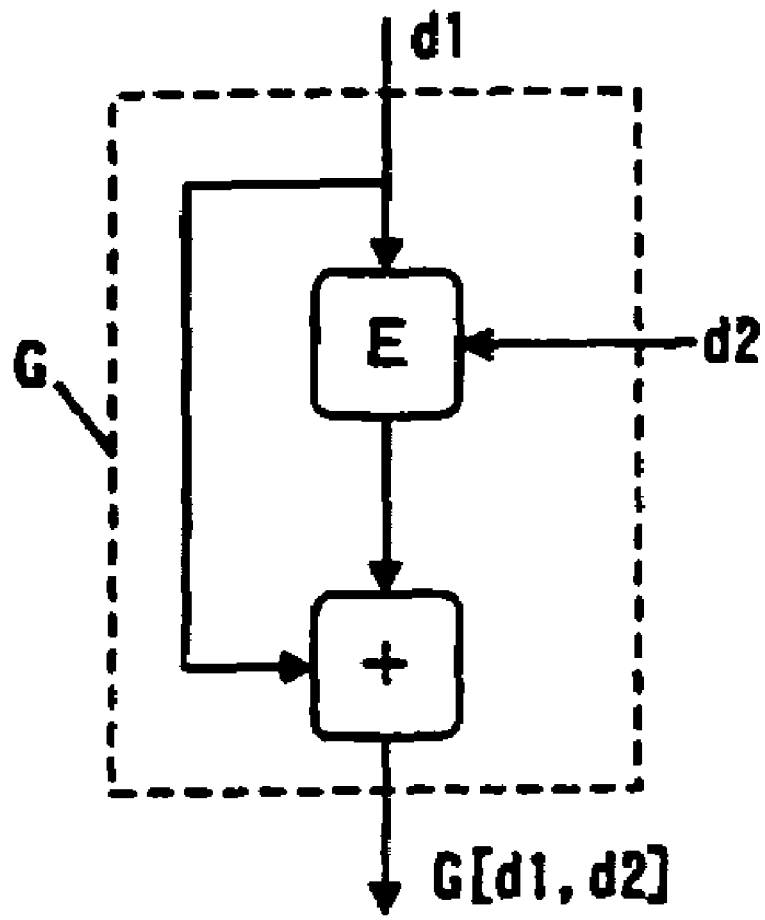
FIG. 10 shows an example of a one-way function used for establishing a secure session.

As shown in FIG. 10, the one-way function encrypts an input d2 with an input d1 and outputs an encrypted d1. Furthermore, the one-way function calculates exclusive-OR (ExOR) value of the input d1 and the encrypted d1. In this case, the input d1 corresponds to the encrypted random number and the input d2 corresponds to the authentication key Ka.

On the other hand, the function also calculates TOKENa by inputting the encrypted random number E[RANa] and the authentication key Ka to the same one-way function as used by function 73 (STEP 9d), and control unit 8A checks the TOKENa corresponds to the TOKENa (STEP 9e).

When above described authentication process is finished, encryption/decryption function 73 of control unit 7A encrypts a random number RANb, generated by random-number-generation function 79, with the authentication key Ka (STEP 9f). And the encrypted random number E[RANb] is transmitted to personal computer 20A via interface 13.

When control unit 8A of personal computer 20A receives the E[RANb], the encrypted random number E[RANb] is transferred to encryption/decryption function 81. Function 81 decrypts the E[RANb] with the same authentication key Ka as used by function 73 and extracts the RANb (STEP 9g). In addition, function 81 calculates TOKENb by inputting the authentication key Ka and the encrypted random number E[RANb] to the one-way function (STEP 9h). The TOKENb is transmitted to mobile terminal 10A via interface 27.

On the other hand, encryption/decryption function 73 also calculates TOKENb by inputting the E[RANb] and the authentication key Ka to the same one-way function as used by function 81 (STEP 9i), and control unit 7A checks whether the TOKENb corresponds to the TOKENb from personal computer 20A (STEP 9j).

When above described two authentication processes is finished properly, an encryption key transmitting process is executed next.

Hash-calculation/key-generation function 72 does ExOR calculation of the random number RANb and the RANa extracted by the decryption process and outputs the ExOR calculation result (STEP 9k). After that, a session key Sk is calculated by inputting the ExOR calculation result and a secret key Kn to the one-way function (STEP 9l).

In this case, the input d1 of FIG. 10 corresponds to the ExOR calculation result and the input d2 of FIG. 10 corresponds to the secret key Sk.

On the other hand, hash-calculation/key generation function 87 also does ExOR calculation of the RANa and RANb extracted by the decryption process and outputs the ExOR calculation result (STEP 9m). After that, a session key Sk is calculated by inputting the ExOR calculation result and a secret key Kn to the one-way function (STEP 9n).

The session key Sks generated by mobile terminal 10A and personal computer 20A are some key because of generated by common algorithm.

When the session key generation process is finished, encryption/decryption function 73 of mobile terminal 10A generates the encryption key by using the download time from personal computer 20A and own telephone number (STEP 9o) and encrypts the encryption key with the generated session key Sk (STEP 9p). The encrypted content key is transmitted to personal computer 20A.

When personal computer 20A decrypts the encrypted key with the session key Sk generated by function 87 (STEP 9r), and further decrypts the encrypted content with the extracted encryption key.

Figure 7:
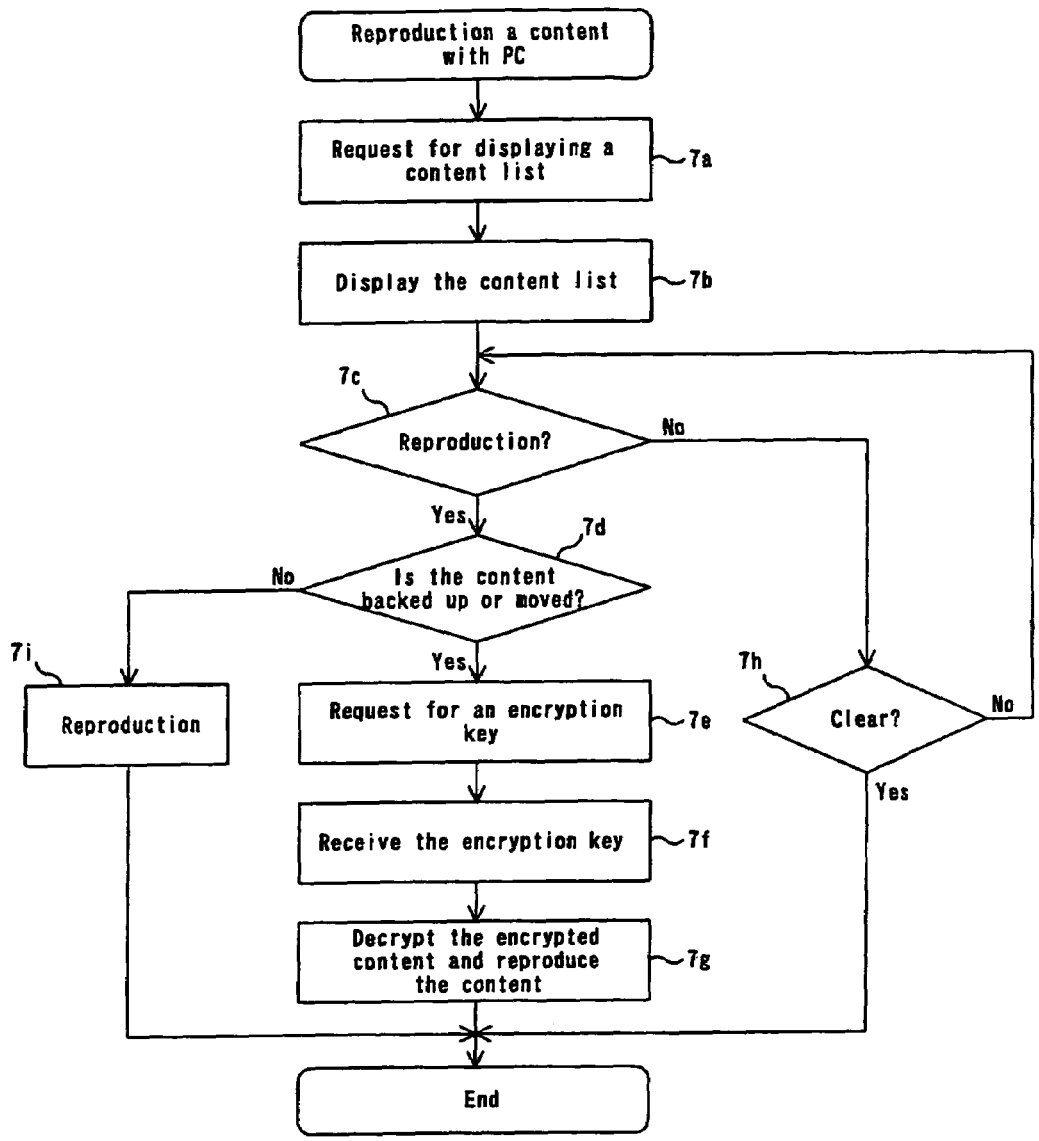
FIG. 7 is a flow chart showing reproduction of a backed up and moved content with a personal computer.

In addition, if a request other than the reproduction request is inputted at STEP 7c of FIG. 7, it is checked whether this request indicates termination of the present process (STEP 7h). If no (No of STEP 7h), for example scrolling the content list and moving a cursor, the designated request is executed and back to STEP 7c. Or if yes (YES of STEP 7h), the present process is terminated and standby display is displayed.

On the other hand, if the selected content, at STEP 7d), is not the content backed up or moved from mobile terminal 10A, for example the content titled BB or CC of FIG. 8 is selected, control unit 8A instructs playback function 85 to reproduce the designated content. Then, function 85 reads out the designated content from memory 22 and reproduces it.

In addition, if the content titled BB or CC is encrypted, a key for decrypting the content is generated by hash-calculating/key-generation function 8 and encryption/decryption function 81 decrypts the content with the key before reproducing.

As described above, if the content is encrypted with an encryption key generated by use of information inherent to a user such as telephone number, the user can enjoy the content with an external device to which the content is moved or backed up. In addition, it can be prohibited to use the content endlessly.

Second Embodiment

In the second embodiment, it is assumed that a personal computer moves a content, which the personal computer downloads from a content server and copies out of a storage media such as CD-ROM, to a mobile terminal. The content stored in the personal computer is encrypted with an encryption key (hereinafter, PC bind key), which is generated by use of information inherent to the personal computer such as a terminal ID. And when the content is moved (imported) to the mobile terminal, the content is converted from the condition of encrypted with the PC bind key to the condition of encrypted with a key (hereinafter, user bind key) generated by use of random number or information inherent to the mobile terminal such as telephone number.

(1) Import

Figure 11:
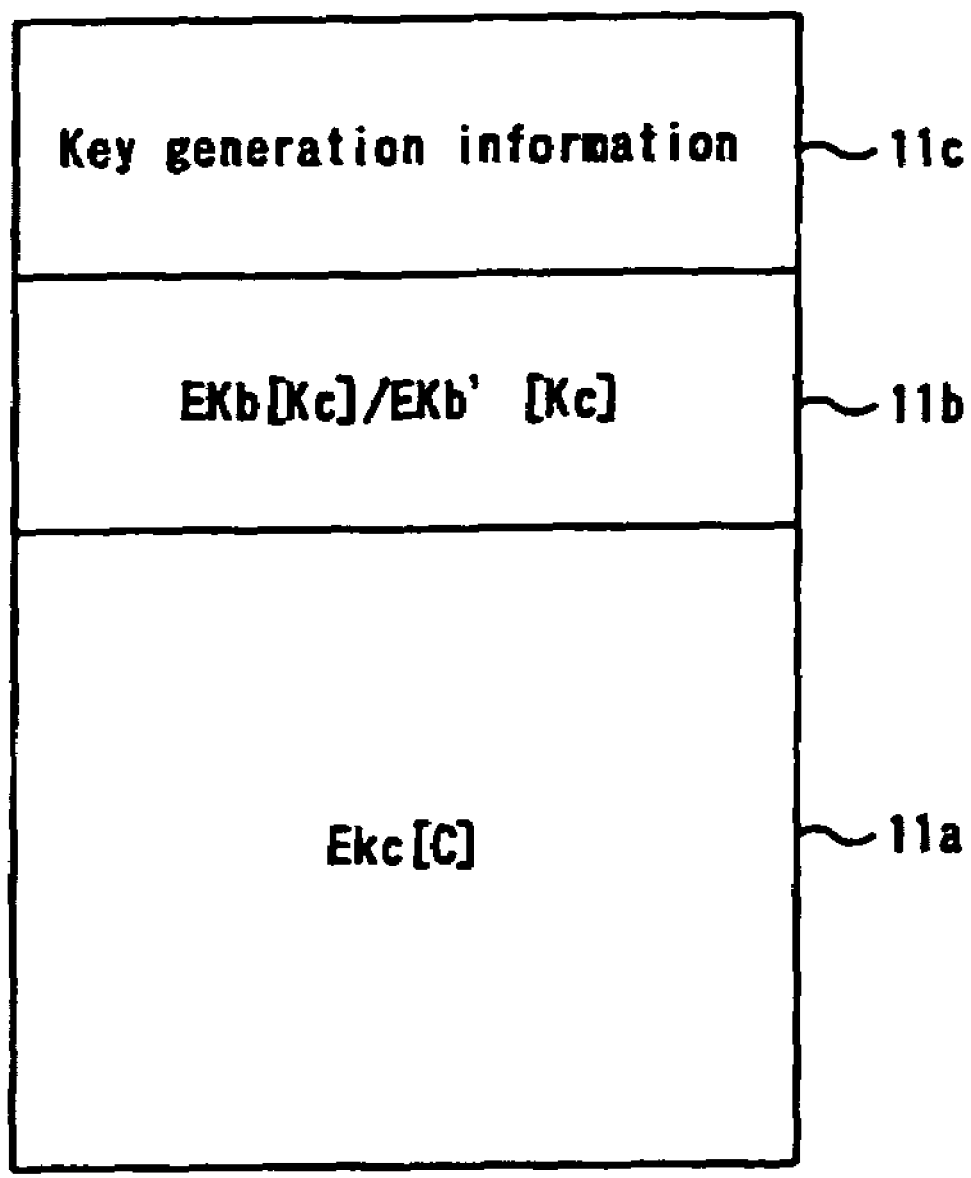
FIG. 11 shows an example of a file format accommodating a content moved from the content server and the CD-ROM.

FIG. 11 shows an example of a file format accommodating a content moved from the content server and the CD-ROM. This file format has three areas, where area 11a is provided for storing an encrypted content EKc[C] which is extracted by encrypting a content C with content key Kc, area 11b is provided for storing an encrypted content key EKb[Kc] and EKb Kc] which is extracted by encrypting the content key Kc with the PC bind key Kb or the user bind key Kb and area 11c is provided for storing information, such as download time and random number, to be used for generating the PC bind key and/or the user bind key.

Figure 12:
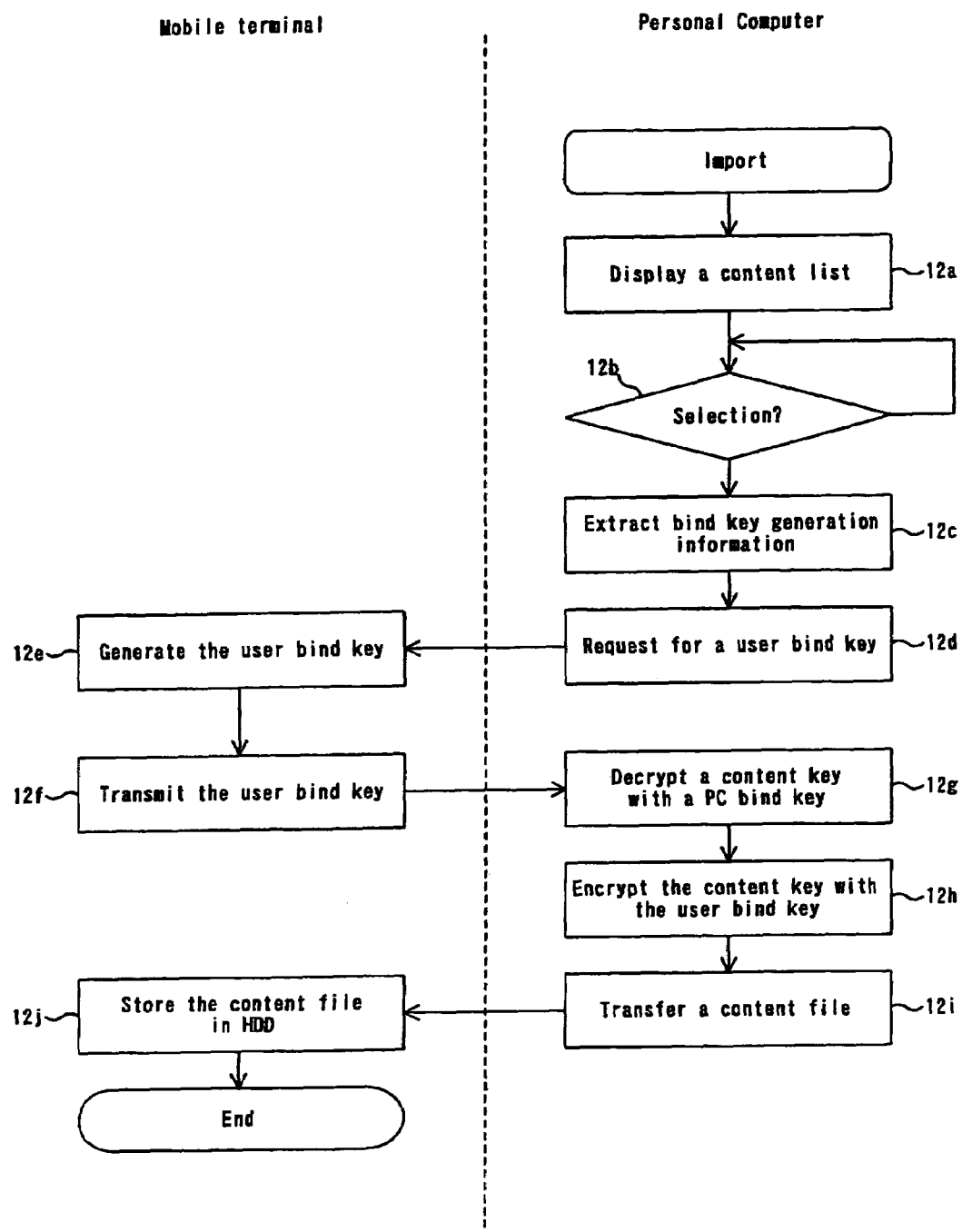
FIG. 12 is a flow chart showing content importing process from a personal computer to a mobile terminal.

Here, it will be described for moving a content from personal computer 20A to mobile terminal 10A with reference to FIG. 12.

When import function, which is the function for moving a content file from memory 22 to HDD 10, is started while personal computer 20A is connected with mobile terminal 10A, control unit 8A reads out content information such as title of the content and display the information on display 24 (STEP 12a).

In this condition, control unit 8A checks whether any content is selected to be moved by operating input device 26 (STEP 12b). And if one content is selected, control unit 8A reads out bind key generation information stored relating to the selected content (STEP 12c), and transmits a request, which includes the bind key generation information, for generating a user bind key Kb to mobile terminal 10A (STEP 12d).

When mobile terminal 10A receives the request for generating a user bind key from personal computer 20A (STEP 12de, hash-calculation/key-generation function extracts the bind key generation information from the request and generates a user bind key Kb by combining the bind key generation information and information, for example terminal ID or telephone number), inherent to mobile terminal 10A. After that, control unit 7A transmits the user bind key Kb to personal computer 20A (STEP 12f).

By the way, it is preferable that the process for generating and transmitting the user bind key is executed on the secure session established by the session function 76 and 82. For example, the bind key generation information and the user bind key are encrypted by the session key Sk, as described in FIG. 9, before they are transmitted.

Next, when control unit 8A of personal computer 20A receives the user bind key Kc from mobile terminal 10A, encryption/decryption function 81 generates the PC bind key Kc by combining the bind key generation information and information inherent to personal computer 20A such as its terminal ID, and decrypts the encrypted content key EKb[Kc] with the PC bind key Kb (STEP 12g). After that, function 81 encrypts the content key Kc with the received user bind key Kb (STEP 12h).

Figure 13:
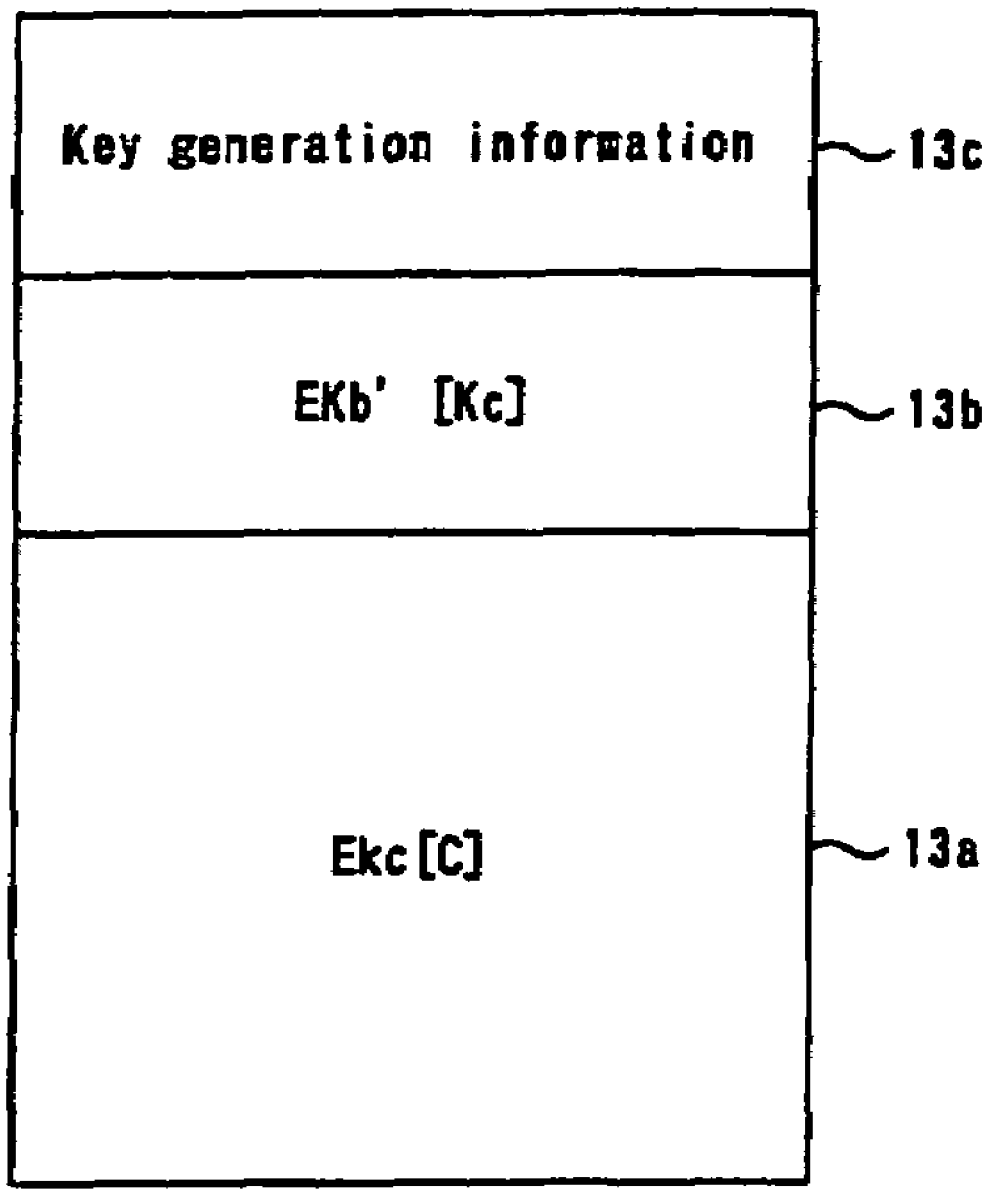
FIG. 13 shows an example of a converted content file for importing to a mobile terminal.

When above described process is finished, as described in FIG. 13, control unit 8A transmits the content file including encrypted content EKc[C] 13a which is encrypted with the content key Kc, encrypted content key EKb Kc] 13b which is encrypted with the user bind key Kb and bind key generation information 13c to mobile terminal 10A (STeP 12i). Mobile terminal 10A stores the content file from personal computer 20A in HDD 10 (STEP 12j). Then, the content moving (importing) process is finished.

(2) Reproduction

When the content moving process from personal computer 20A to mobile terminal 10A is finished, the content becomes reproducible with mobile terminal 10A.

Figure 14:
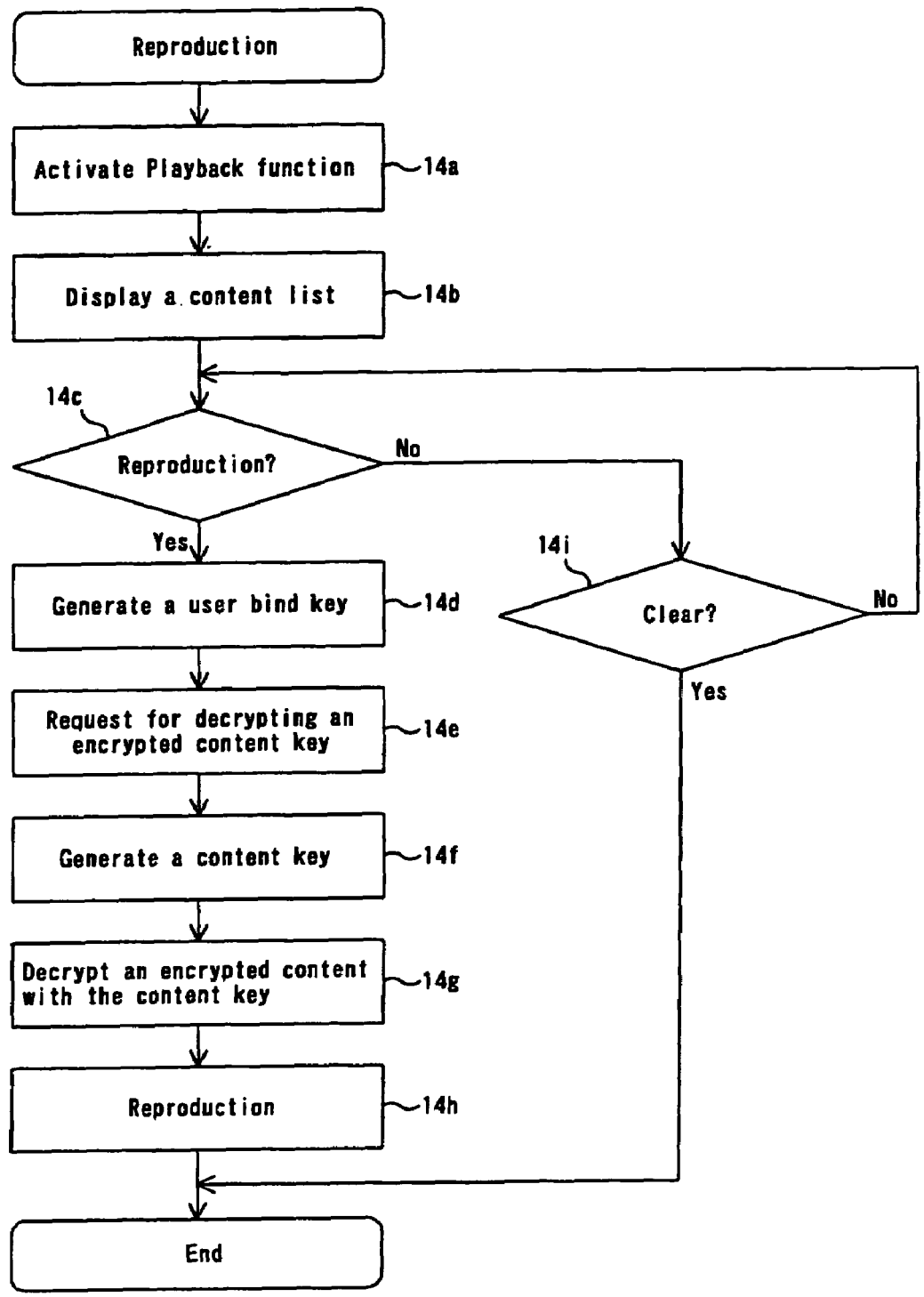
FIG. 14 is a flowchart showing reproduction process of the moved content a mobile terminal

FIG. 14 is a flowchart showing reproduction process of the moved content with mobile terminal 10A.

Firstly, when a function for reproducing a content is activated by operating input device 15 (STEP 14a), control unit 7A reads out titles of contents from HDD 10 and displays a content list on display 14 (STEP 14b). At this time, a cursor is located on the first title.

Subsequently, control unit 7A checks whether a reproduction request is inputted, and if the reproduction request in inputted (YES of STEP 14c), control unit 7A reads out a content file focused by the cursor from HDD 10. And control unit 7A extracts a random number RAN from the content file and requests hash-calculation/key-generation function 72 to generate a user bind key Kb by using the random number RAN (STEP 14d).

When the user bind key Kb is generated, control unit 7A transfers an encrypted content key EKb Kc] and the user bind key Kb to encryption/decryption function 73 and requests for decryption (STEP 14e). When encryption/decryption function 73 receives the request, function 73 decrypts the encrypted content key EKb Kc] with the user bind key Kb and extracts a content key Kc (STEP 14f).

When the content key is extracted, control unit 7A further requests function 73 to decrypt the encrypted content EKc [C]. Then, a content C is obtained by decrypting the encrypted content EKc[C] with the content key Kc (STEP 14g), and the content C is reproduced on display 14 by playback function 78 (STEP 14h).

On the other hand, if a request other than the reproduction request is inputted from input device 15, it is checked whether this request indicates termination of the reproduction process. If the request indicates the termination, a standby display is displayed (YES of STEP 14j), and if the request indicates other than the termination, for example moving a cursor and the change of page, the designated request is executed and waits for next request (NO of STEP 14j).

As described above, if the content is encrypted with an encryption key generated by use of information inherent to a device such as terminal ID, the user can enjoy the content with an external device to which the content is moved or backed up. In addition, it can be prohibited to use the content endlessly.

What is claimed is:

1. A mobile communication terminal comprising:
a first interface programmed to communicate with a content server;
a second interface programmed to communicate with an external device; and
a control unit programmed to:
  download, via the first interface, a content from the content server;
  assign a download time to the content when the content is downloaded, wherein the download time is one of: (i) generated by a clock unit provided in the mobile communication terminal , and (ii) generated based on a time obtained from a base station;
  generate a first encryption key based on at least the download time and information inherent to the mobile communication terminal;
  obtain an encrypted content by encrypting the content with the generated first encryption key;
  move, via the second interface, the encrypted content and the download time to the external device;
  receive, via the second interface, a key generation request including the download time from the external device;
  generate a second encryption key based on the download time extracted from the key generation request and the information inherent to the mobile communication terminal; and
  transmit the second encryption key to the external device;
whereby the content becomes playable at the external device when the second encryption key coincides with the first encryption key, and
wherein the mobile communication terminal is programmed to receive the key generation request from the external device when an input is made on the external device instructing the encrypted content to be played on the external device.

2. The mobile communication terminal according to claim 1, wherein the information is a telephone number of the mobile communication terminal.

3. The mobile communication terminal according to claim 1, wherein the control unit is programmed to establish a secure session with the external device when transmitting the second encryption key to the external device.

4. A mobile communication terminal comprising:
a first interface programmed to communicate with a content server;
a second interface programmed to communicate with an external device; and
a control unit programmed to:
  download, via the first interface, a content from the content server;
  assign a download time to the content when the content is downloaded, wherein the download time is one of: (i) generated by a clock unit provided in the mobile communication terminal, and (ii) generated based on a time obtained from a base station;
  generate a first encryption key based on at least the download time and information inherent to the mobile communication terminal;
  obtain an encrypted content by encrypting the content with the generated first encryption key;
  provide, via the second interface, the encrypted content and the download time to the external device;
  receive, via the second interface, a key generation request including the download time from the external device;
  generate a second encryption key based on the download time extracted from the key generation request and the information inherent to the mobile communication terminal; and
  transmit the second encryption key to the external device;
whereby the content becomes playable at the external device when the second encryption key coincides with the first encryption key, and
wherein the mobile communication terminal is programmed to receive the key generation request from the external device when an input is made on the external device instructing the encrypted content to be played on the external device.

5. The mobile communication terminal according to claim 4, wherein the information is a telephone number of the mobile communication terminal.

6. The mobile communication terminal according to claim 4, wherein the control unit is programmed to establish a secure session with the external device when transmitting the second encryption key to the external device.

7. The mobile communication terminal according to claim 4, wherein the control unit is programmed to provide the encrypted content and the download time to the external device by backing up, via the second interface, the encrypted content and the download time to the external device.

8. The mobile communication terminal according to claim 6, wherein the information is a telephone number of the mobile communication terminal.

9. The mobile communication terminal according to claim 6, wherein the control unit is programmed to establish a secure session with the external device when transmitting the second encryption key to the external device.

* * * * *